Sept. 25, 1956  A. B. NELSON  2,763,872
TOILET FLUSH TANK FLOAT VALVE
Filed March 25, 1953
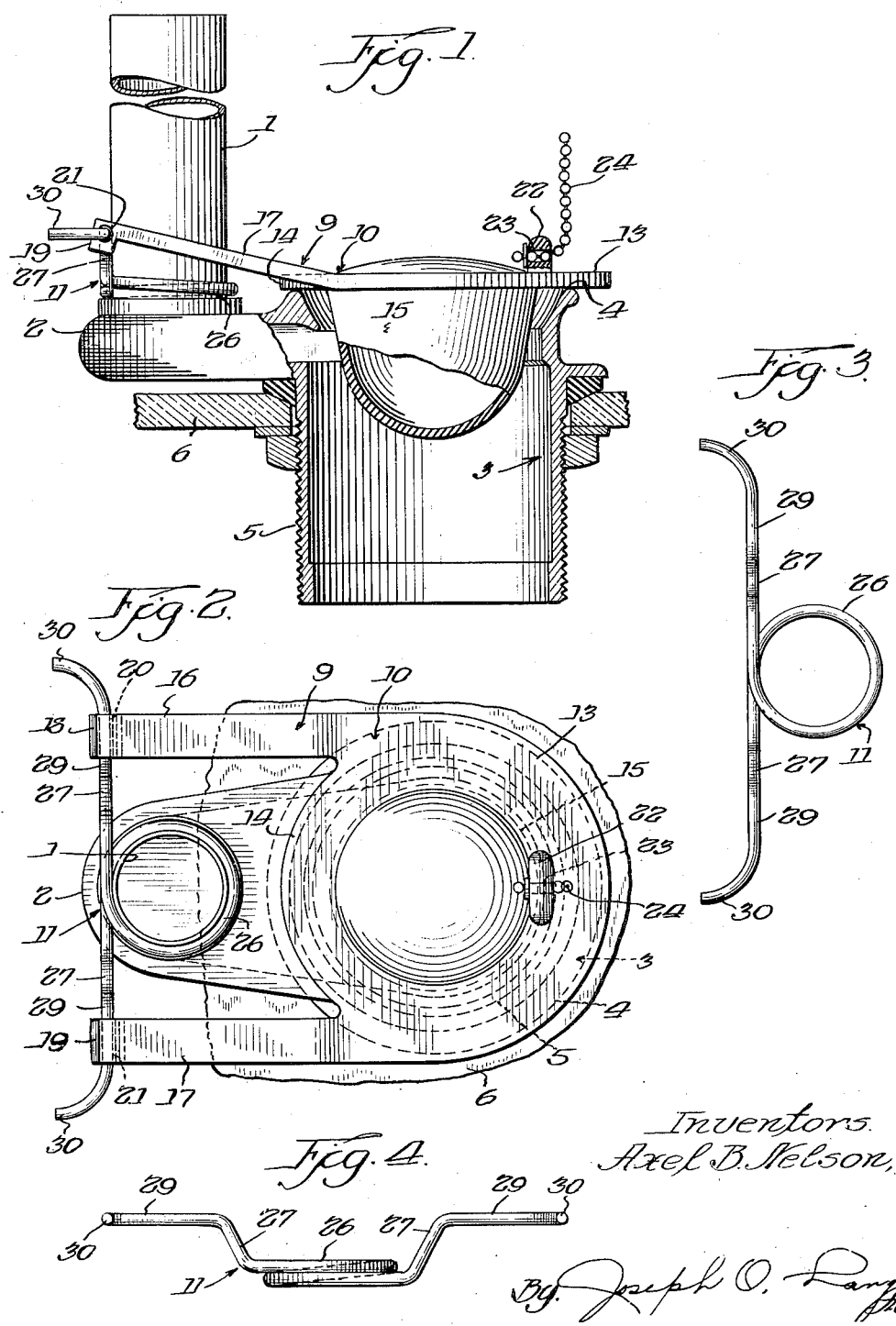
Inventors.
Axel B. Nelson,
By Joseph O. Lange
Atty.

United States Patent Office 2,763,872
Patented Sept. 25, 1956

2,763,872
TOILET FLUSH TANK FLOAT VALVE

Axel B. Nelson, Chicago, Ill., assignor to Crane Co., a corporation of Illinois

Application March 25, 1953, Serial No. 344,506

2 Claims. (Cl. 4—57)

This invention relates generally to valves, and more particularly to discharge valves for use in water closet flush tanks or the like.

In acquiring an appreciation of the background of this invention, it should be understood that in order to eliminate sticking of the ball type flush valves and to effect more positive seating, swing or flapper valves of various forms have in the past been developed. These include a one-piece rubber flapper member adapter to fit over and stretch around the overflow tube for positioning of the member by frictional gripping of the stretched or stressed rubber. The present invention constitutes an improvement over the latter form particularly by making use of a separate metal clamp and of a valve disc or closure member adapted to be attached thereto.

It is one of the important objectives of this invention to provide a flush valve or the like of the type described having greater freedom of movement than the one-piece construction above described.

Another important object is to provide a valve which cannot lodge within the seat port and which is reliable in operation.

It is another object to provide a valve which is longer lasting or more durable. This is preferably accomplished by virtue of the metallic rather than the usual rubber connection to the overflow tube, the rubber of the latter connection being subject to deterioration, flow or loss of resiliency eventually resulting in loosening and change of position of the valve member.

Yet another object is to provide for easier and more convenient assembly and also for more positive gripping of the overflow tube to prevent its working loose or causing dislocation of the valve member relative to the said tube.

A further object of great importance is to provide for a single valve closure or flapper member which is adaptable for connection to various overflow tubes of different sizes as in tanks of various manufacturers by the use of different clamps formed to fit the various overflow tubes.

A still further object is to provide a valve in which the closure or flapper portion can be quickly and easily replaced.

Another object is to provide a valve of the type described which can be installed in the conventional flush tank and which is efficient and reliable in operation and relatively easy and inexpensive to manufacture.

Other objects and advantages will appear upon proceeding with the description, read in light of the accompanying drawings in which Fig. 1 is a sectional view of a fragmentary portion of a flush tank to which a valve of my invention has been applied.

Fig. 2 is a top plan view of the same.

Fig. 3 is a top plan view of the clamp member taken separately.

Fig. 4 is an elevational view of the clamp member shown in Fig. 3.

Like reference numerals refer to like parts in the several views.

Referring now to the drawings, 1 is the usual overflow tube of a flush tank for toilet bowls which is connected at the bottom and is in communication with the hollow interior of a side extension or projecting portion 2 of the usual fitting 3, the latter having a valve seat 4 and outlet extension 5 passing through the floor of the flush tank 6. The above is of conventional construction and therefore needs no further description.

The valve assembly of the present invention is generally designated 9 and is made up of a valve disc or closure member 10 and a mounting or retaining member 11 which fits around the lower portion of the overflow tube for positioning of the closure member. The closure member or flapper valve as it is often referred to is made of rubber or other suitably flexible material and comprises a substantially flat disc-like seat contacting portion 13 from which a hollow or otherwise buoyant float portion 15 depends, being received within the fitting 2 in the closed position shown. A pair of spaced-apart arms 16 and 17 extend in the direction of and at either side of the overflow tube 1 terminating in thickened portions 18 and 19, respectively. These portions are apertured at 20 and 21, respectively, for the passage of aligned leg portions 29 of the friction clamp or retaining member 11. These leg portions form hinge or pivot pins about which the flapper valve 10 is hinged and free to rotate as will hereinafter be described.

The clamp member may be constructed of wire or similar rod material which is preferably non-corrosive and comprises a center portion 26 which is formed into a tight loop of a single coil of slightly less diameter than the overflow tube passing therethrough in the mounted condition. More than a single loop or coil may be employed for greater friction and more positive positioning if desired. The clamp member extends laterally or outwardly at each side, preferably, but not necessarily, in straight-line relationship, being offset or upwardly extending at 27 before forming the horizontal pin portions 29 above referred to. The opposite ends 30 are turned rearwardly in this case, although they could be extended upwardly or in any other direction, to prevent the arms 16 and 17 of the flapper member 10 from being displaced. Means can also be provided such as pins (not shown) or flattened places on the inside to prevent the flapper arms from sliding down the inclines of the offset portions 27 if deemed necessary, or the offsets could be vertical, extending into the pin portions 29 so as to form a positioning stop just inwardly of the normal position of the arms 16 and 17 of the flapper valve.

The clamp member 11 is adapted to slip over the upper end of the overflow tube 1 and slid therealong towards the bottom by slightly squeezing the offset or end portions 27 and 30, respectively, together or by applying rearward force on the laterally extending arms of the clamp so as to expand or enlarge the central coiled portion. The clamp member should be mounted so as to be all the way down and into flat abutting relationship with the top of the offset or projecting portion 2 of the outlet fitting 3 as shown in Figs. 1 and 2 before releasing the same for frictional or clamping engagement with the overflow tube. The flapper valve 10 can be easily assembled on the clamp member before or after the latter has been so mounted on the overflow tube by simply slipping the arms 16 and 17 over the end portions 30 of the clamp member after slightly deforming momentarily the pliable valve member.

The flapper member is formed into a suitable extension 22 at the front adjacent the float portion 15 which is slotted or apertured at 23 for reception of a flexible chain 24 for operation of the valve member. A flexible cord or a rubber strip could be employed instead, if desired, functioning substantially in the same manner as the chain. The upper end of the chain or cord is connected to the usual lever operator (not shown) which causes the flapper valve to be lifted off the seat 4 when actuated for discharge of the tank and flushing action of the toilet bowl.

One of the advantages of the present valve over the one-piece arrangement of the prior art is the relatively unrestrained action provided by virtue of the flapper member being freely pivotable about the separate mounting or retaining member 11. Tests have shown that any but the slightest bending, twisting or similar distortion will resist or work against flotation of the flapper member as it is being brought upwardly into complete submergence in tank water to the extent that the same must be lifted farther than otherwise necessary to achieve buoyancy in the area of drag adjacent the discharge opening at 4. The lever operator presently in standard use in flush tanks does not seem to have sufficient angular throw for reliable operation of the one-piece rubber valve at all times. The instant two-piece construction with its freedom of movement falls well within the operative range of the present lever actuators, without need of a special one at additional cost.

The tendency of the one-piece construction to loosen and change position because of deterioration, flow or loss of resiliency of the rubber mounting has already been referred to and it should suffice to say that the present invention gives a much more durable and positive mounting. In assembly, the clamp can be simply squeezed and slipped over the overflow tube, rather than being pulled or dragged therealong against the friction which is relied on to keep the same in place when finally brought into position, making such assembly very simple and easy. As mentioned, the wire clamp member can be formed so as to accommodate different size overflow tubes in common use and thus permit the use of a single size flapper valve for all installations. Should the latter become worn, the entire assembly need not be replaced, but only the valve member or flapper portion, which can be easily slipped off the ends 30 of the mounting portion and quickly replaced, without the necessity of twice sliding and pulling a rubber mounting along the length of the overflow tube.

One of the serious difficulties encountered with the one-piece rubber construction of the prior art is the tendency of the same not to close or seat properly under certain conditions of use. This defective operation was occasioned by the rearmost part of the seating portion of the valve disc, indicated by 14 in the present valve, becoming lodged within the seat or more particularly the port or outlet opening therethrough dislocating the seating portion of the valve and causing the float portion to ride on the valve seat on the opposite side preventing closure of the valve. Investigation has shown that this condition is brought about by a lack of rigidity in the rubber valve member which permits distortion or elongation of the arm or cross arm portions particularly so that the rear of the seating portion may be drawn into and caught on the edge of the outlet opening by the onrush of water therethrough after initial lifting of the valve. One of the important advantages of the present valve over the prior art construction is reliability of operation without danger of sticking. Such malfunctioning is prevented from occurring in the instant valve by the necessary rigidity or stiffness being provided by the wire clamp member 11 which extends between the arms 16 and 17 of the valve member and to which the latter are attached for rigid substantially unyielding support.

From the above, it is seen that an improved flapper valve and mounting means has been provided which can be used with existing flush tanks without change and that the same is convenient and easy to install or replace and efficient of operation and further affords longer lasting, more positive connection to the overflow tube and more reliable service.

Although a certain form of the invention has been disclosed, the appended claims should not be restricted to the details thereof but should be limited only by their respective terms read in the light of the disclosure and in view of the prior art and falling within the spirit of the invention.

I claim:

1. A valve assembly for use in a tank or the like having a ported seat and an overflow tube comprising a closure member for cooperation with the ported seat in the closed valve position, a one piece friction clamp for positioning said closure member, said clamp having a coiled center portion comprising at least one coil adapted to resiliently engage said overflow tube when the valve assembly is mounted thereon, the two ends of said coiled center portion extending to each side respectively laterally beyond the said coiled center portion, said coiled center portion being adapted to expand upon force being applied to the side portions simultaneously so as to be released from resilient engagement of the overflow tube, said side portions being formed to provide aligned supports for the closure member, said closure member having spaced arms extending along opposite sides of said overflow tube when the assembly is mounted thereon, said latter arms and said aligned supports of the clamp being adapted to cooperate with each other for free pivotal movement of the closure member relative thereto during valve operation.

2. The subject matter of claim 1, each of said side portions of the clamp including integral elements inwardly and outwardly of the portions thereof normally supporting the spaced arms of the closure member for retention of said arms in operative position, said arms being apertured for reception of the aligned supports of the clamp and further being constructed of distortable resilient material permitting passage of the outer retaining elements through the apertures during connection and disconnection of the closure member to and from the clamp member and retaining the spaced arms on said aligned supports for normal valve operation.

References Cited in the file of this patent

UNITED STATES PATENTS

| | | |
|---|---|---|
| 1,201,416 | Ziemer | Oct. 17, 1916 |
| 1,937,271 | Garcia | Nov. 28, 1933 |
| 2,142,393 | Halteman | Jan. 3, 1939 |
| 2,598,967 | Bennett | June 3, 1952 |
| 2,602,933 | Curry | July 15, 1952 |
| 2,643,393 | Karr | June 30, 1953 |